Sept. 13, 1938.  E. E. HANS  2,129,930
MEANS FOR INJECTING A PLURALITY OF MOTOR
FUELS INTO INTERNAL COMBUSTION ENGINES
Original Filed June 13, 1933   5 Sheets-Sheet 1

INVENTOR.
BY Edmund E Hans
ATTORNEY.

Sept. 13, 1938.    E. E. HANS    2,129,930
MEANS FOR INJECTING A PLURALITY OF MOTOR
FUELS INTO INTERNAL COMBUSTION ENGINES
Original Filed June 13, 1933    5 Sheets-Sheet 2

INVENTOR.

BY  *Edmund E. Hans*

ATTORNEY.

Sept. 13, 1938.                    E. E. HANS                    2,129,930
            MEANS FOR INJECTING A PLURALITY OF MOTOR
            FUELS INTO INTERNAL COMBUSTION ENGINES
                   Original Filed June 13, 1933    5 Sheets-Sheet 4

INVENTOR
BY *Edmund E. Hans*
ATTORNEY.

Sept. 13, 1938. E. E. HANS 2,129,930
MEANS FOR INJECTING A PLURALITY OF MOTOR
FUELS INTO INTERNAL COMBUSTION ENGINES
Original Filed June 13, 1933 5 Sheets-Sheet 5

INVENTOR.
BY
*Edmund E. Hans*
ATTORNEY.

Patented Sept. 13, 1938

2,129,930

UNITED STATES PATENT OFFICE 2,129,930

MEANS FOR INJECTING A PLURALITY OF MOTOR FUELS INTO INTERNAL COMBUSTION ENGINES

Edmund E. Hans, Detroit, Mich.

Substitute for abandoned application Serial No. 675,598, June 13, 1933. This application January 20, 1938, Serial No. 185,915

9 Claims. (Cl. 123—127)

This application is a substitute for application #675,598, filed June 13, 1933.

This invention is not just a way of using two fuels by shifting from one fuel to another. Alcohol is used in my invention to quench or eliminate the ping or knock in the combustion chamber of an internal combustion engine the very instant it appears, by an automatic thermostat control valve, after the temperature of the motor has risen to the point where the common gasoline has reached its useful limit, thereby protecting the lubricating oil from being contaminated with alcohol and eliminating possible rusting or corrosion and saving the use of alcohol during the warming period.

The benefit derived from the use of alcohol as a fuel is an additional contribution. By automatically releasing slugs or meager quantities of alcohol with common gasoline as a motor fuel at intervals over the entire high power, wide or nearly wide open throttle range to a speed where pinging is no longer noticeable. Alcohol is automatically cut-out before pinging disappears, this being accomplished by adjusting the lever on cowl or dash which controls the length of time alcohol is in use. A light on the dash signals when alcohol is on or off. If the motor pings up 40 miles per hour with wide or nearly wide open throttle, the lever is then adjusted to cut-out alcohol at 25 or 30 miles per hour, thus saving the alcohol not required up to a speed of 40 miles per hour, there being sufficient alcohol in the manifold and combustion chamber to quench any possible ping up to 40 miles per hour. Under these driving conditions this adjustment feature is a complete revelation to the carburation system. It is possible to cut in and out the use of alcohol at any desired speed over the entire driving range. Over a speed of approximately 60 miles per hour the average car would not require the use of alcohol as the pinging is practically nil. Again, we have a complete revelation in the internal combustion engine contrary to present practice increasing combustion chamber compression by approximately 40% with the use of common gasoline resulting in a saving of over 20% in fuel costs, together with considerable increase in horse power. The cost of alcohol is twice that of ordinary gasoline, yet the total fuel cost is considerably less than that of the present low compression motors.

Adjacent to this adjustment, also within reach of the operator, is another control to regulate the metering cam which proportions the use of the two fuels. The motorist can at once detect the slightest variation in the quality of the common gasoline, because at all times he is informed as to the full value of the two fuels used. Changing to another fuel he will at once detect its quality. Here is another complete revelation in the carburation system.

This invention also makes possible the use of a very low grade of motor fuel no matter what its anti-knock qualities may be in combination with the use of alcohol. The use of the above stated fuel is adjusted to its highest useful limit at which time the alcohol automatically blends with the same in the required proportion after the adjustment is made on the dash, thereby giving the motorist the full value of a low grade fuel. Thus he can venture in the fuel market and ascertain the various qualities obtainable, then make his decision as to which is most satisfactory and economical. The motorist no longer need rely on recommendations of others, he is master of the situation.

There have been many unfoldments in this invention. With the motor in action pinging and knocking may occur under different driving conditions, therefore adjustment is always available to suit the individual. One who drives gently would use little or no alcohol and still be able to maintain the required speed for ordinary traffic.

There is also provided an automatic means for instantaneous application of the use of alcohol to quench the ping before the common gasoline has had an opportunity to reach the combustion chamber. This is an added feature to the governor control which in itself could not accomplish this whenever the throttle is opened with great rapidity at any driving speed. This added feature can be so adjusted that a sufficient slug of alcohol may be released in the carburetor to quench the ping during the entire acceleration from a standing start to approximately 30 miles per hour, mostly needed in city traffic driving. This invention also provides for more economical use of motor fuel by a vacuum metering valve to enrich the mixture at low speed wide open throttle and cuts out at any desired speed resulting in greater power at low speed and is more economical at high speed.

In my two-bowl carburetor design, the bowl which contains the alcohol is forward of the bowl containing common gasoline, so that when the car is moving forward the alcohol will go into the combustion chamber before the common gasoline.

The above and other objects will appear more fully from the following more detailed description and by reference to the accompanying drawings forming a part hereof wherein:

Fig. 28 is a central sectional diagrammatic view of a carburetor illustrating a method of injecting alcohol into the cylinders whenever the throttle is opened suddenly;

Fig. 29 is an alternate construction of Fig. 28, of which

Fig. 30 is a central sectional diagrammatic view of the carburetor;

Fig. 31 is a fragmentary sectional view taken substantially on line 31—31 of Fig. 29 in which the thermostat and valve are shown in full so as to more fully show the operation of the same;

Fig. 32 is a fragmentary sectional view taken substantially on line 32—32 of Fig. 31, of which the spiral bi-metal thermostat is shown in full so as to show more fully the operation of the same;

Fig. 33 is a fragmentary sectional view taken substantially on line 33—33 of Fig. 31;

Fig. 34 is a fragmentary view of an alternate construction of Fig. 24 showing a method of making a contact before butterfly valve opens;

Fig. 35 is a fragmentary sectional view taken substantially on line 35—35 of Fig. 34. The lever arrangement is shown in full to more fully illustrate the operation of same;

Fig. 36 is a fragmentary sectional view taken substantially on line 36—36 of Fig. 35 illustrating the method of holding valve in position by a weight.

Figure 1:
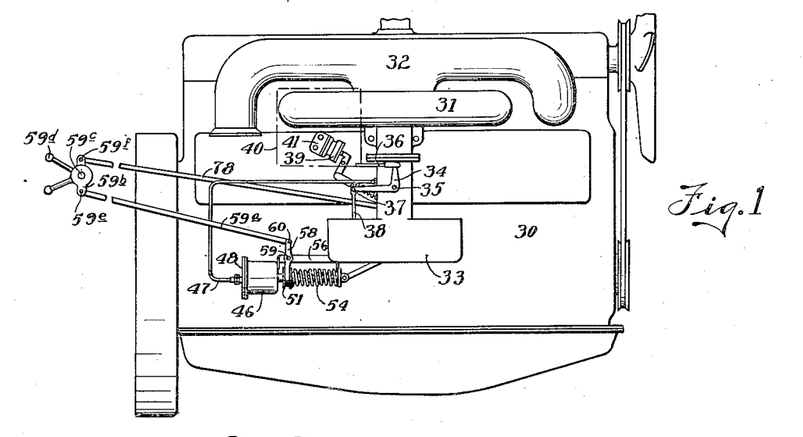
Fig. 1 is a side view of an engine incorporating my novel fuel system.
Figures 2, 3, 4, 5, 19:
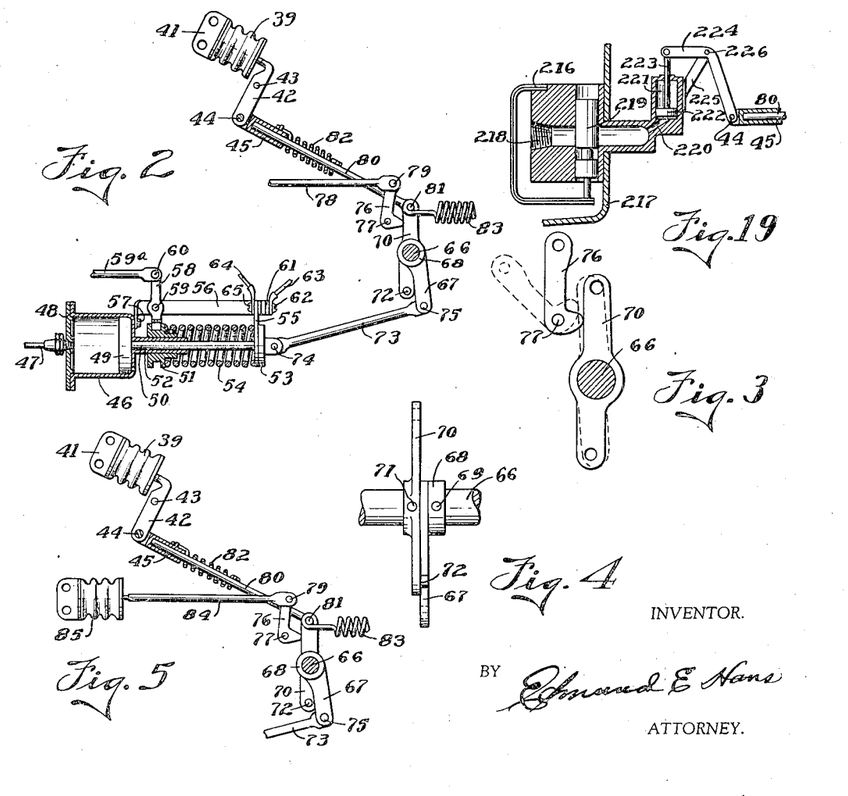
Fig. 2 is a diagrammatic view, showing the basic operation of the fuel control.
Fig. 3 is an enlarged diagrammatic view of the cam shown in Fig. 2 illustrating the metering action of said cam.
Fig. 4 is an end view of Fig. 3.
Fig. 5 and Fig. 6 are alternate constructions of Fig. 2.
Fig. 19 is a diagrammatic view of an oil control used to supplant the thermostatic control shown in Figs. 2 and 5.
Figure 6:
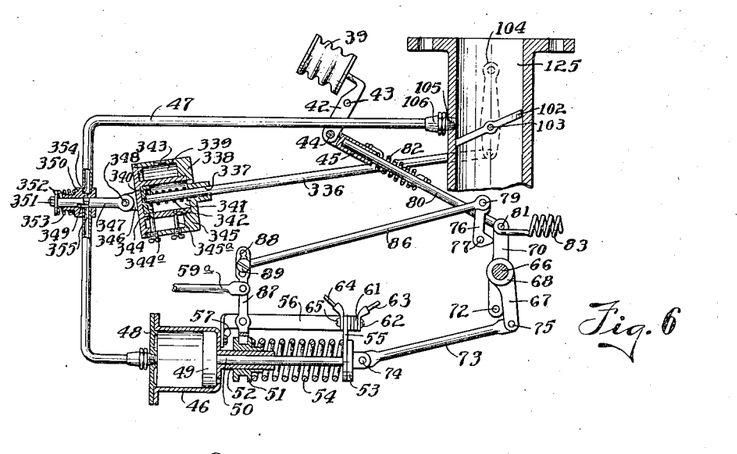
Figures 20, 21A:
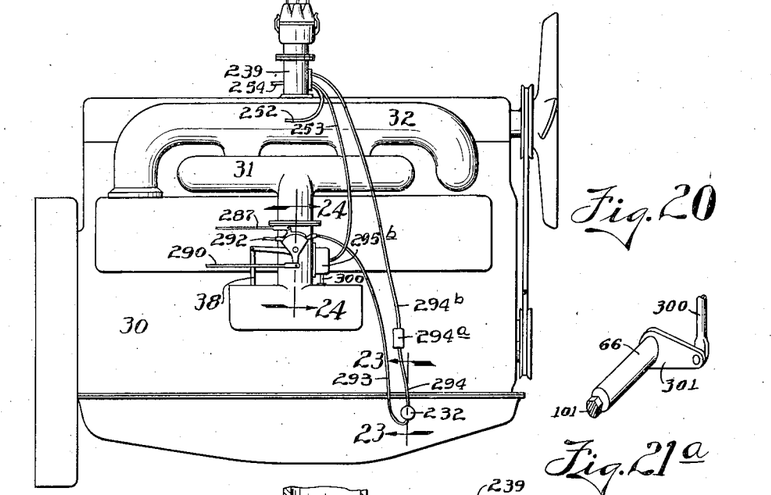
Fig. 20 is a side view of an engine incorporating a new novel and alternate type of fuel control, using an electrically operated system.
Fig. 21a is an enlarged fragmentary perspective view showing a method of operating the valve controlling the fuel in the carburetor.

Referring now to the drawings, the numeral 30 designates the conventional type of motor block found in the modern automobile. Numeral 31 designates the intake manifold built adjacent the exhaust manifold 32 and is so constructed that a portion of the intake manifold 31 is tightly fitted to exhaust manifold 32 for a purpose later to be described. Numeral 33 represents a two-bowl carburetor, the purpose of which will also later be described. Numeral 34 designates a bell crank lever journaled in the side of the carburetor intake throat 33, as at 35. The upper end of the bell crank 34 is connected to the foot throttle by means of connecting link 36. The other extremity of the bell crank 34 is loosely mounted as at 37 to one end of the plunger 38 (Fig. 20). A thermostat 39 is conveniently housed in the box-like structure 40, said housing acting as an insulator for the thermostat 39 so that the temperature of said thermostat and the intake manifold will remain constant. The thermostat 39 is securely attached by any suitable means near the intake manifold 31 as at 41. Suitably secured to one end of the thermostat 39 is a lever 42, said lever being pivoted at 43, the lower extremity of lever 42 being loosely connected by means of a shoulder rivet 44 to the sleeve 45. Numeral 46 represents a vacuum control chamber that can be mounted upon the carburetor in any suitable manner. A conduit 47 is screw-threaded into the plate 48 on one end of the cylinder 46. A piston 49 is mounted inside of the outer casing of the vacuum control chamber 46, the same being built integral with rod 50. Numeral 51 designates a yoke collar slidably mounted on the sleeve 52. At the other end of the rod 50 an abutting flange 53 is built integral with the rod 50. A coil spring 54 is interposed between the collar 51 and bracket 55, said bracket at its lower end having an aperture to receive the rod 50 and at its upper end an aperture to receive threaded screw 65. One end of the bracket 56 is suitably fastened to the vacuum control chamber housing 46 by means of a cap screw 57. (See Figs. 1, 2 and 6.) Yoke arm 58 is fulcrumed at 59 on bracket 56. The link 59a is pivotally connected to the yoke arm 58 at 60 and leads to the dash control arm 59b which is bolted on the dash by means of threaded bolt 59c. Rod 78 leads from metering control cam 76 to dash adjusting lever 59d, 59d being back of 59c and having a frictional washer interposed between 59c and 59d. Rod 59a is connected to control arm 59b by means of pin 59e and rod 78 is connected to control arm 59d by means of pin 59f. Bracket 56 is bent on one end to form a flange 61, said flange being apertured to receive threaded screw 62. Interposed between the flange 61 and screw 62 is a wire terminal 63. A wire terminal 64 is also attached to bracket 55 by means of a threaded screw 65. (Figs. 2 and 6.) The shaft 66 is journaled into the wall on both sides of the carburetor neck below the venturi. A floating arm 67 is mounted upon the shaft 66 and held in position by a collar 68 and pin 69. The arm 67 is mounted so that it may be freely moved upon the shaft 66. A governor arm 70 is keyed to the shaft 66 by means of the pin 71. Mounted upon the lower extremity of the governor arm 70 is a pin 72, the purpose of which will be later disclosed. A connecting link 73 is interposed between the floating arm 67 and the flange 53 and is pivoted by means of pins 74, 75. A metering control cam 76 is mounted on the carburetor throat 33 by means of the pin 77. Metering control cam 76 is connected to the dash by means of link 78, said link being pivotally mounted on the cam by means of pin 79. A thermostat control rod 80 has one end pivotally mounted to control arm 70 by means of pin 81, the other end of said control rod 80 being slidably mounted in sleeve 45. A coil spring 82 has one of its ends fastened to sleeve 45 and the other end to arm 80 and tends to keep the thermostat control rod 80 and sleeve 45 in taut relationship with one another. A light tension coil spring 83 is mounted between control arm 70 and motor block (not shown) in any suitable manner. In an optional construction Fig. 5, control link 84 supplants control link 78 which is pivotally connected as at 79 to the cam 76, Fig. 2, the other end of said link being formed integrally with the thermostat 85, said thermostat being suitably attached to any suitable place on the motor where it will come into contact with the heat dispensed thereby.

A further optional construction is shown in Fig. 6 of the drawings wherein reference character 86 indicates a link fork connecting cam 76 and forked rod 87, the upper end of said fork having a plurality of notches broached therein, as at 88, to receive shoulder screw 89. Pivotally mounted to the lower end of the butterfly arm 104 is one end of plunger rod 336. This rod 336 passes through aperture 337 in retaining cap 338 of oil reservoir cylinder 339. The other end of rod 336 is rigidly attached to piston 340 which is slidably mounted within the inner hydraulic chamber 341. A spring 342 is interposed between the piston 340 and the rear wall of the retaining cap 338. Reference character 343 indicates an oil inlet into the reservoir. Numerals 344, 345 indicate valve openings or suction inlet and discharge ports having needle valves 344a, 345a to meter said openings. Numeral 346 indicates a boss built integral with the outer body of the hydraulic cylinder 341. A valve 347 is yoked with an aperture therethrough and pin 348 passes through said aperture and boss 346 thereby enabling the valve to move freely. An opening 349 is a flat spot milled on the bottom side of the valve stem 347 sufficient in length so that when the valve stem is pulled to the right the slot will be half over the conduit 47 and half exposed to the atmosphere, said stem being held in place by means of nut 351, which has a washer 352 interposed between said nut and the main body of the valve. A spring 353 is interposed between the washer 352 and valve body 350. The suction side of the casting 350 has a constriction 354 to meet the requirements, while a relief opening 355 is of greater diameter to allow for intake of atmosphere and to also allow piston 49 to go back to neutral position with greater rapidity.

Figure 6A:
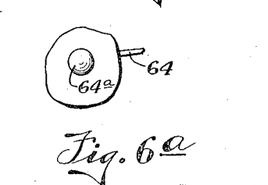

Fig. 6a represents a fragmentary view of the instrument panel of which 64a indicates a light operated by current in wire 64 in Figs. 2 and 6, said light being grounded to complete the circuit.

Figure 7:
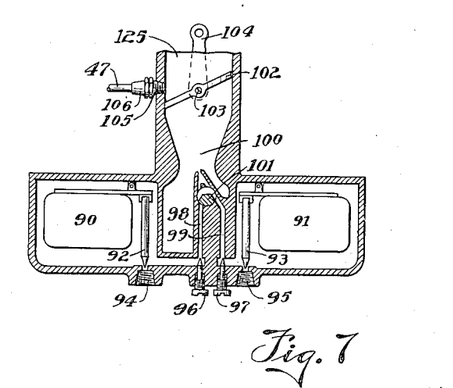
Fig. 7 is a diagrammatic view of a carburetor, illustrating the valve control of fuel.

Fig. 7 discloses a two-bowl carburetor showing the floats in closed position, said floats being designated by the numerals 90, 91. The floats 90, 91 are mounted in the conventional manner. Needle valves 92, 93 may be adjusted to allow a variety of fuels to pass therethrough. Inlet ports 94, 95 are provided to allow motor fuels to enter the float chambers. Numerals 96, 97 designate adjustable metering valves. Intake fuel conduits 98, 99 lead into the venturi 100. A control valve 101 is interposed between the intake fuel conduits 98, 99, said control valve being part of the shaft 66 (Fig. 6). A butterfly valve 102 is mounted on the shaft 103, said shaft being journaled into the sides of the intake manifold in the customary manner. Numeral 104 designates a control arm which is operated in the usual manner from the foot throttle. A male connector 105 and union nut 106 are provided to fit into the side of the intake manifold through a suitable aperture.

Figure 8:
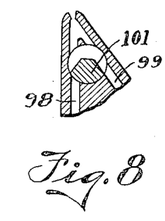
Figs. 8 and 9 are fragmentary views showing the detail operation of the valve shown in Fig. 6.
Figure 9:
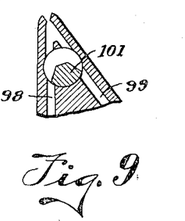

Figs. 8 and 9 disclose fragmentary views showing the detailed operation of the valve 101 shown in Fig. 7.

Figure 10:
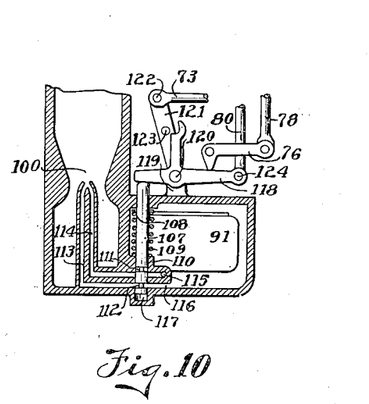
Fig. 10 is an alternate construction of the carburetor, shown in Fig. 6, incorporating a plunger type valve.

Fig. 10 discloses another method of handling the valve control, housing a plunger valve in the place of a rotating valve. A plunger valve 107 is mounted in the carburetor bowl in a vertical position, a stop pin 108 passes through the valve 107 a sufficient distance to allow one end of the coil spring 109 to abut thereagainst, the lower end of said spring abutting against the boss 110. Openings 111, 112 are provided as a means for allowing the flow of two fuels into conduits 113, 114 leading to the venturi 100. Fuel inlet openings 115, 116 lead to the valve 107. A recess or well 117 is formed in the lower part of the carburetor bowl to allow free operation of the plunger valve. A rocker arm 118 is mounted on top of the carburetor bowl by means of boss 119, said boss having an aperture therein through which a pin 120 passes and also passes through link 121. The upper end of link 121 is connected to connecting link 73 by means of pin 122. A pin 123 is suitably mounted on link 121 for engagement with the curvature provided in the upper part of rocker arm 118. Thermostat control arm 80 is connected to rocker arm 118 by means of pin 124.

Figure 11:
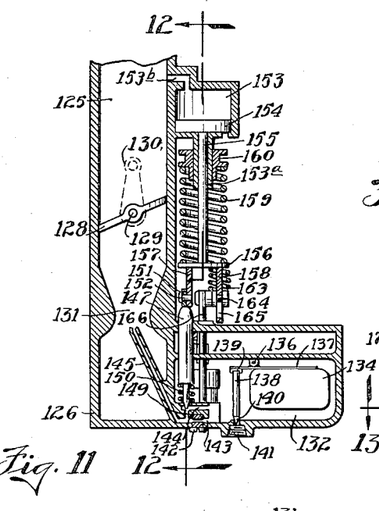
Fig. 11 is a central sectional view of a carburetor, incorporating a view of valve operation for regulating the fuel supply at various speeds of the engine.
Figures 11A, 13, 14, 15, 16, 17, 18:
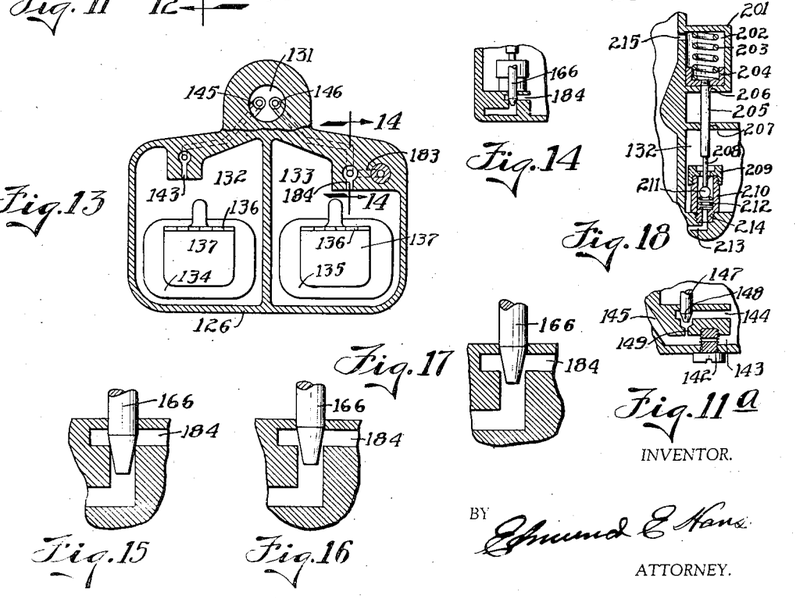
Fig. 11a is a detail of metering valve and metering plug shown in Fig. 11.
Fig. 13 is a section taken substantially on the line 13—13 of Fig. 12.
Fig. 14 is a fragmentary sectional view taken substantially on line 14—14 of Fig. 13.
Figs. 15, 16 and 17 are fragmentary diagrammatic views showing the operation of the valve control incorporated in said carburetor.
Fig. 18 is an alternate construction of the valve incorporated in Fig. 11.
Figure 12:
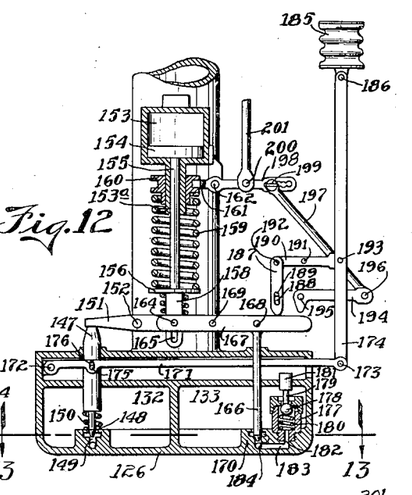
Fig. 12 is a section taken substantially on the line 12—12 of Fig. 11 illustrating the operation of the valve control.

Figs. 11, 12 and 13 illustrate a one unit fuel system wherein the metering mechanism and control system is built integral with the carburetor. This construction comprises an intake manifold 125 and a two-bowl carburetor 126. Mounted within the intake manifold 125 is the conventional type of butterfly valve 128, the same being mounted upon the shaft 129 and journaled in the sides of the intake manifold 125. Mounted on the shaft 129 is a throttle valve arm 130, the same being linked in the usual manner to the accelerator (not shown). The lower portion of intake manifold 125 is curved inwardly to form a bottleneck venturi 131. Mounted within the float chambers 132, 133 are two floats 134, 135, said floats being pivotally mounted as at 136, the floats being secured to float arms 137. The free end of the float arm 137 has a float pin 138 pivotally mounted on the arm 137 as at 139. Float pin 138 has a tapered end 140 to permit the pin to seat in the intake boss 141. Numeral 142 designates a conventional metering plug having a hole bored through the same to permit the passage of the desired amount of fuel. A pair of inlet fuel passages 143, 144 are formed to allow fuel to pass from the carburetor bowls into the spray nozzles 145, 146. A needle valve 147 is set vertically into the carburetor bowl, the lower part of the valve being tapered as at 148 to seat in the conduit 149. A coil spring 150 is mounted upon the tapered portion of the valve to keep the weight off the same. A rocker arm 151 is pivotally mounted on the intake manifold by means of pin 152. Built integral with the intake manifold 125 is a cylinder 153 having a piston 154 and rod 155 mounted therein, said cylinder 153 having a sleeve 153a formed integrally with the cylinder. The lower end of the rod 155 has a flange 156 with two depending lugs 157, 158 formed thereon. A coil spring 159 is interposed between the adjusting collar 160 and the flange 156. The adjusting collar 160 is slidably mounted on the sleeve 153a and is held in any desired position on the sleeve by means of a lever 161 having its end forked, said forked lever being pivotally mounted to the manifold by means of pin 162. Numeral 153b designates a vacuum communicating channel from the vacuum chamber 153 into the riser 125 (Fig. 12). A light coil spring 163 is interposed between the flange 156 and pin 164. Lug 158 is slotted as at 165 to permit the free motion of pin 164. Valve 166 is pivotally mounted on bar 167 by means of pin 168. Arm 167 is pivotally mounted to the intake manifold by means of pin 169. The lower end of valve 166 is tapered and seats in boss 170. A thermostat control bar 171 is pivotally mounted within the carburetor bowls, one end of said bar being pivoted as at 172 and the other end of said bar being pivotally mounted as at 173 to thermostat push rod 174. The thermostatically controlled rod 171 has a slotted portion 175 to allow free movement of pin 176. A cylindrical valve cage 177 is screw threaded into the base of the carburetor. A ball check 178 is seated against the inlet spring 179 and ball 178 is held in position by spring 180. A push rod 181 is seated to come into engagement with the thermostatically controlled bar 171 after thermostat has reached high temperature. On the lower portion of the valve cage 177 is a metering conduit 182 which communicates with conduit 183. Numeral 184 designates a metered opening into the main inlet passage to the float chamber for alcohol. Push bar 174 has a thermostat 185 mounted at its upper extremity by means of pin 186. Thermostat control finger 187 has its lower end slotted as at 188 to receive guide pin 189. The control finger 187 is pivotally mounted to a rocker link 190 on pin 191. Pin 192 connects control finger 187 and rocker link 190. Rocker link 190 is also pivotally mounted to push bar 174 by means of pin 193. A metering control cam 194 is pivotally mounted at 195 and at 196 to control link 197, the upper end of which is yoked, one side of the yoke being threaded to receive shoulder screw 199. The portion of the forked rod 198 through which shoulder screw 199 passes has formed therein semicircular openings to allow for adjustment of the shoulder screw 199. Also pivotally mounted to the forked rod 198 as at 200 is a forked rod 201 which leads to the dash control indicator.

Figs. 14, 15, 16 and 17 are fragmentary views showing the operation of the metering valves shown in Figs. 11 and 12, and the use for same will be explained in the portion of my specification dealing with how my device operates.

Fig. 18 discloses a special valve control which may be adapted to any carburetor to give a rich mixture at wide open throttle up to moderate speeds from 25 to 35 miles per hour. Numeral 202 designates a cylinder built integral with the manifold 125. Housed within the cylinder 202 is a coil spring 203. Slidably mounted within the cylinder 202 is a cup-shaped piston 204. A rod 205 is loosely fitted to the piston 204 through an aperture 206 in the bottom of the cylinder. The rod 205 passes through an aperture 207 in the carburetor bowl 132 and terminates in a reduced stem 208, said stem fitting into an opening in the top of the screw threaded cap 209, which is attached to the main valve body 210. The stem portion of the valve 208 contacts a ball check valve 211 which is seated upon a coil spring 212 above fuel conduit 213. A metering plug 214 is pressed into the bottom of the main valve body. A suction inlet 215 is formed in the wall of the intake manifold 125.

Fig. 19 discloses a hydraulic thermostat control valve comprising a thermostat body 216 which is connected to the lower part of the crank case 217. Numeral 218 represents an oil inlet passage to the thermostat control valve. Opening 218 is connected to the regular oiling system and is under constant pressure while the engine is in motion causing a pressure against thermostat plunger valve 219. Conduit 220 communicates with the cylinder 221 within which is slidably mounted piston 222 and rod 223. An L-shaped lever 224 is pivotally mounted on the cylinder body by means of bracket 225, and pin 226 said bracket being secured to the body of the cylinder 221. L-shaped lever supplants arm 42 and is connected to sleeve 45 by means of a pin 44.

Fig. 20 discloses an alternate type of fuel control structure using an electrically controlled system. Reference numeral 228 designates a thermostat which operates the plunger 229, the plunger moves to the left and contacts contact point 230 which in turn is moved over until it contacts with contact point 231 thereby closing the circuit allowing the system to function. The housing 232 in which the contact points are housed is secured to the crank case 233 by means of the nut 234, the outer housing 232 is screwed into the main thermostat control body 235. Coil spring 236 is interposed between screw threaded cap 237 and thermostat control rod collar 238 which is built integral with rod 229.

Figures 21, 22, 23, 24, 25, 26, 27:
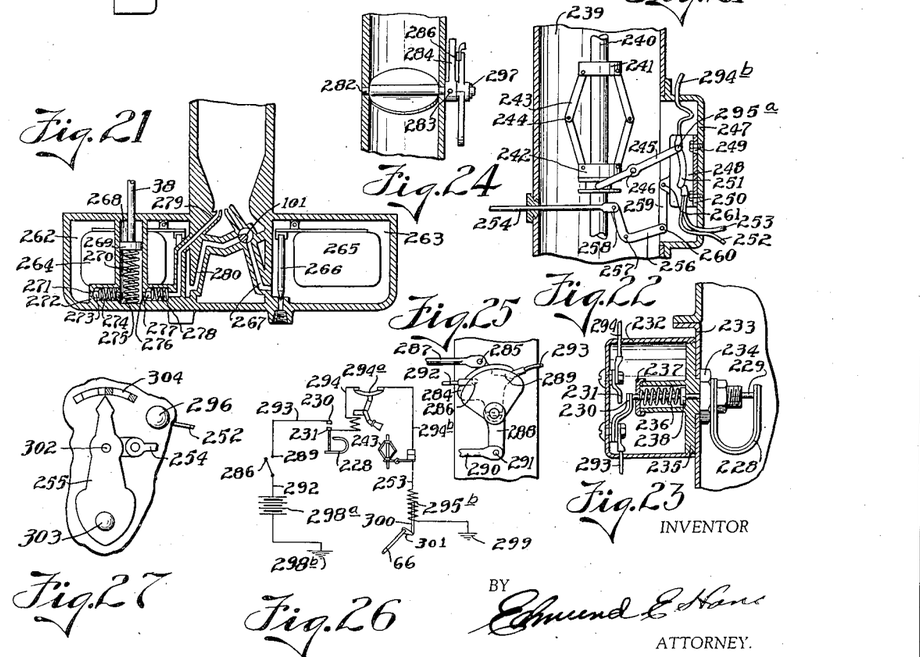
Fig. 21 is a diagrammatic view of a carburetor, illustrating the valve control of the fuel.
Fig. 22 is a central sectional view of the governor.
Fig. 23 is a section taken substantially on the line 23—23 of Fig. 20.
Fig. 24 is a fragmentary section taken substantially on the line 24—24 of Fig. 20.
Fig. 25 is a fragmentary end view of Fig. 23 showing the contact point being variable.
Fig. 26 is an electric diagram view showing the complete circuit incorporated in my invention.
Fig. 27 is a fragmentary view of the dash control or metering adjustment.

Fig. 22 discloses a governor which is installed in the distributor 239 (Fig. 20) comprising a distributor drive shaft 240 upon which is mounted the governor, said governor having a collar 241 built integral with the shaft 240. Slidably mounted on the shaft 240 is a grooved collar 242. Weight links 243 are interposed between the two collars 241, 242 pivoting on pins 244. A forked rod 245 is pivotally mounted on the distributor housing by means of the pin 246. Slidably mounted upon the wall 247 of the governor housing is a contact carriage 248. A pair of slots 249, 250 allow the contact carriage to be moved to the desired adjustment. A contact plate 251 is mounted upon the carriage 248 and insulated therefrom. Lead wires 252, 253 are connected to the contact plate 251 in the usual manner. A connecting rod 254 connects the dash control 255 (see Fig. 27) with contact carriage 248 by means of L-shaped lever 256 which is pivotally connected to the inner wall of the governor housing by means of the pin 257. One end of the L-shaped lever 256 is pivotally mounted to the connecting rod 254 by means of pin 258, while the other end of L-shaped lever 256 is pivotally connected to link 259 by means of pin 260, the upper end of link 259 being pivotally mounted to the contact carriage by means of pin 261.

Fig. 21 illustrates a diagrammatic view of a carburetor showing the valve control of fuel. Numerals 262, 263 designate the float chambers and 264, 265 designate the floats supported in the usual manner. Numeral 266 represents the conventional type of needle valve found in carburetors. Numeral 267 represents the conduit running to the float chamber. Numeral 268 represents a pump chamber formed in the carburetor bowl, said chamber having slidably mounted therein piston 269 and plunger 36, a coil spring 270 being interposed between the piston and the base of the pump chamber. An aperture 271 is formed in the intake housing 272. A check valve 273 and spring 274 abuts against the same. At the opposite end of the intake housing is another aperture 275 leading into the pump chamber 270. A discharge aperture 276 leads from the pump chamber to the spray nozzle conduit 279 and a ball check valve 277 and spring 278 is interposed therein. Conduit 280 also leads into carburetor float chamber 262. This conduit is provided with the usual metering plug (not shown). A metering valve 101 is so constructed that fuel from both carburetor bowls will enter.

Referring to Fig. 24, reference numeral 282 designates pivot shaft for butterfly valve having pin 283 anchoring throttle control lever 284, said lever having a contact point 286, and being actuated by a connecting rod 287 pivotally mounted by pin 285. Contact point 286 is electrically connected to battery by electric wire 292. Contact lever arm 288 is floatably mounted on shaft 282 and held in position by cotter pin 297, a contact plate 289 being actuated by an adjusting rod 290, controlled on the dash conveniently located for the driver, said rod being pivotally mounted by pin 291 (Fig. 25). Contact plate 289 being electrically connected to thermostat contact point 230 (Fig. 23) by electrical wire 293.

Briefly the operation is as follows: Contact lever arm 288 Figs. 24, 25, act as the time element and is controlled by the driver through rod 290 (Fig. 20). If it is desired that electrical contact be made sooner than at normal operation, the lever arm 288 (Figs. 24, 25) revolves anti-clockwise through rod 290 thus bringing the contact points 286 and 289 in a closer relation with one another and when the throttle is opened by revolving the throttle control lever 284 in a clockwise direction, contact will be made earlier, allowing the electrical energy to pass through wire 293 to thermostat.

Referring to thermostat which acts as the heat control mechanism, allowing no electrical energy to flow through unless motor becomes heated to a predetermined point, bi-metal strip 228 actuates rod 229 which in turn pushes plate 230 in contact with plate 231 closing the circuit and allowing electrical energy to pass through wire 294, interrupter 294a and wire 294b to contact point 295a in governor shown in Fig. 24, said point being in constant contact with plate 248 except at high speeds of the engine, this allowing the electrical energy to pass through wires 252 and 253, which are in contact with plate 248 at terminal 251. The electrical energy flowing through wire 253, which is connected with solenoid 295b (Fig. 20) operates said solenoid which in turn operates valve 101 in carburetor shown in Fig. 21. At the same instant, energy also flows through wire 252 which operates light 296 on dash. It can be readily seen that the light does not operate unless valve 101 functions allowing the operator to know when alcohol and gasoline are being blended.

Referring to Fig. 26 of the drawings, showing a diagrammatic view of the electrical circuit, reference numeral 298a indicates the battery which is grounded at 298b, said battery supplying the electrical energy flowing through wire 292 to contact point 286, when contact is made with point 289 energy flows through wire 293 to contact point 230. The bi-metal thermostat 228 closes the circuit and allows energy to pass through contact points 230, 231 and wire 294 to an interrupter 294a through a wire 294b to governor which is in contact at all times, except at high speeds. Energy then passes through wire 253 to solenoid 295 which is grounded to the ground terminal 299. The aforesaid solenoid actuates rod 300 which is pivotally connected to link 301 which in turn revolves valve shaft 66.

Fig. 27 represents a control for the instrument panel. Numeral 255 designates a pointer pivotally mounted on the instrument board, by means of the pin 302, having a frictional washer interposed between the indicator hand and panel, and having a spring (not shown) between the back of the panel and the fastening means so that there is a constant tension against the pointer keeping it in the desired adjusted position at all times. Numeral 303 designates a knob built integral with the indicator hand providing a convenient means for adjusting the needle. Numeral 304 designates a scale enabling the driver to note the difference in the condition of his motor or the variation in the different types of fuel used. It is to be understood that there are two of these indicator assemblies on the instrument panel similar to the one shown in Fig. 27, one is to control the metering cam and the other to control the timing of the duration of the use of the fuel. Numeral 254 designates a connecting rod which connects the pointer 255 and the governor control shown in Fig. 22.

Figures 28, 29, 30, 31, 32, 33, 34, 35, 36:
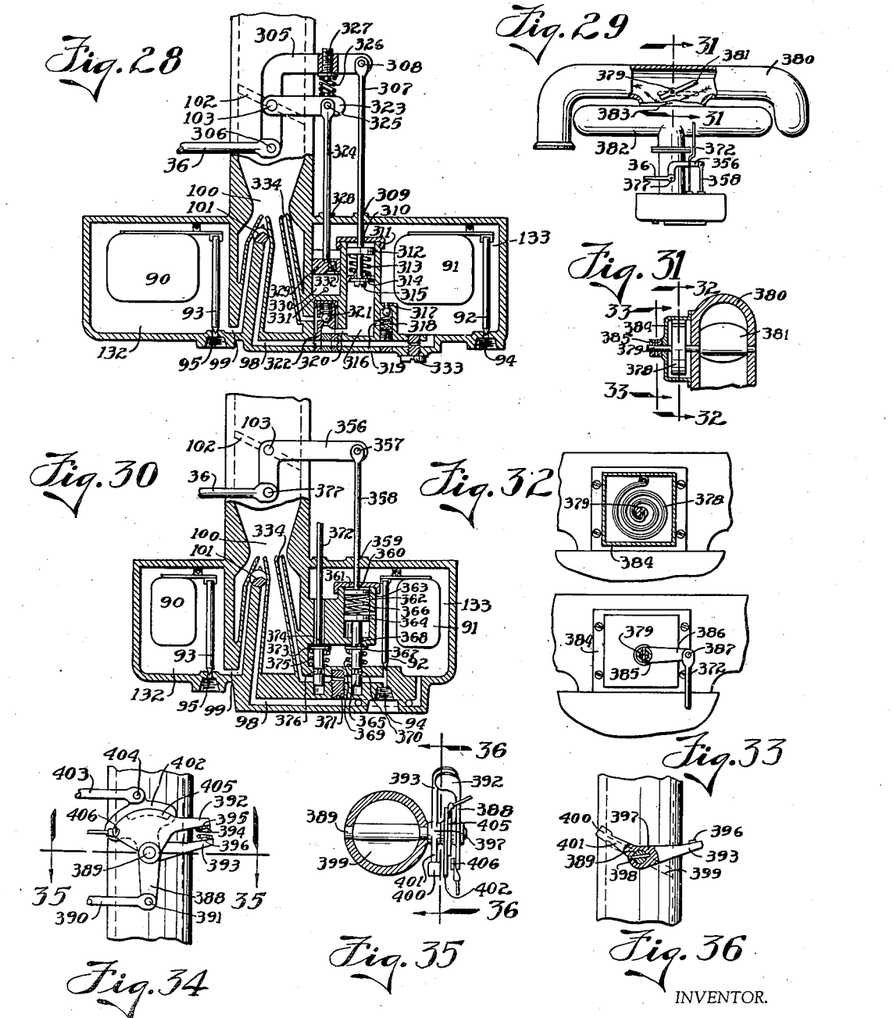

Fig. 28 is a diagrammatic view of a carburetor illustrating another method of injecting alcohol or other chemical compounds into the cylinders whenever the throttle is opened suddenly. Since carburetors are virtually the same construction in principle, reference numerals for similar parts will be the same as in Figs. 11, 12 and 13. Numerals 132, 133 designate the conventional type of float chambers having floats 90, 91 suitably mounted therein in the usual manner, and inlet valves 92, 93 mounted as shown. Floating L-arm 305 is pivotally mounted on butterfly valve shaft 103. The lower end of L-arm 305 has pivotally connected thereto one end of connecting rod 36 by means of pin 306. At the other extremity of floating L-arm 305 is pivotally connected plunger rod 307 by means of pin 308. Rod 307 passes through an aperture 309 into float chamber 133 and through aperture 310 in cap 311 and terminates in piston 312. A spring 313 is interposed between piston 312 and plunger 314, said plunger being held in place by means of retaining screw 315. The plunger 314 is slidably mounted in the cylinder 316. Numeral 317 designates an inlet from float chamber 133 into the check valve chamber 318. A conduit 319 connects said check valve chamber and cylinder 316. A discharge conduit 320 leads to check valve chamber 321.

Numeral 322 designates an assembly plug. Link 323 is pivotally mounted to butterfly valve shaft 103 at one of its ends, the other end of same being pivotally mounted to connecting rod 324 by means of pin 325. Spring 326 is interposed between link 323 and adjustable screw 327 to adjust spring tension. Connecting rod 324 passes through aperture 328 into the float chamber 133 and terminates in piston 329. Numeral 330 designates the cylinder having a bleeder 331 and a check valve 332. Numeral 333 designates a metering plug for alcohol. Numeral 334 designates the alcohol advance spray nozzle.

In an alternate construction of Fig. 28, reference numeral 356, Fig. 30, designates a butterfly arm having pivotally connected to the outer extremity, by means of the pin 357, the plunger rod 358 which passes through aperture 359 in the cap in the top of the float chamber 133. Rod 358 also passes through aperture 360 in the top of the screw threaded cap 361 of the cylinder 362 and terminates into a piston disc 363. Fitted to one end of the valve stem 365 is another piston disc 364. Interposed between the discs 363, 364 is a spring 366, a washer 367 held by a pin 368 is freely fitted on the valve stem 365. A spring 369 is interposed between the washer and the lower part of the bowl. A valve stem 365 is grooved as at 370 which constitutes a valve opening. Numeral 371 designates a metering plug. Numerals 372 designates a valve stem which terminates in a disc 373 having pin 374 to abut against the same. A spring 375 is interposed between the disc and the lower part of the bowl. The valve stem is grooved as at 376 which constitutes a valve opening and which also registers with conduit 334 when valve stem 372 is actuated by a means to be later described. Connecting rod 36 is pivotally mounted to the carburetor arm 356 by means of the pin 377.

Fig. 29 discloses an exhaust manifold and carburetor intake manifold showing the thermostat control on the shutter which controls the temperature of the hot spot. This thermostat 378 (Fig. 32) is mounted on butterfly valve stem 379 and directly controls butterfly valve 381, Fig. 29. Numeral 380 designates the carburetor intake manifold. Numeral 383 designates a hot spot in the exhaust pipe and 382 indicates the intake manifold. Numeral 384 designates a thermostat housing. Numeral 386 (Fig. 33) designates a control arm and is anchored to valve rod 379 by means of a pin 385, said control arm being pivotally connected to rod 372 by pin 387.

Fig. 34 represents an alternate construction of Figs. 24, 25 of which reference numeral 388 indicates an auxiliary throttle control lever floatably mounted on shaft 389, said control lever being actuated by a throttle control rod 390, pivotally mounted at the lower portion of the auxiliary throttle control lever by pin 391. An arm 392 projecting from the upper portion of said lever is separated from a similar projection 393 of the throttle control lever 397 by spring 394, said spring being held in position by pins 395, 396. The throttle control lever 397 is anchored to shaft 389 by pin 398 thus allowing said lever to directly operate valve 399. A weight 400 is permanently fastened to an arm 401 projecting in an opposite direction than arm 393 from the throttle control lever 397 and is so arranged as to keep valve in closed position.

A contact lever arm 402 is floatably mounted on shaft 389, said lever being actuated by control rod 403 which is pivotally mounted to lever arm by pin 404. Said contact lever arm having a contact point 406, which is mounted on auxiliary control rod 388 to meet and glide on said plate 405 in the arc contact point 406 forms when pivoted on shaft 389. The operation is as follows: When throttle control lever is suddenly actuated in an anti-clockwise direction the auxiliary throttle control lever is pivoted on shaft 389 and operates arm 392 against spring 394 momentarily. The weight 400 holds the throttle control lever 396 in position until pins 395, 396 come in contact and then throttle valve has a positive action forcing said valve to open, meanwhile contact points 406 and plate 405 come in contact just before pins 395 and 396 meet, thus allowing the electrical energy to pass through said contact points and operate valve 101 momentarily before throttle valve opens.

The manner in which my device operates is as follows:

The motor is put into operation in the usual manner using regular gasoline. The power for operating the alcohol valve is furnished by the thermostat 39 acting through spring 82. When the motor has warmed up sufficiently the expansion of thermostat element 39 tends to rotate the valve shaft 66 counter-clockwise to open alcohol valve. The extent of opening movement of the valve is limited by member 76, controllable either automatically or manually from the dash, as shown in the different disclosed embodiments, to limit the quantity of admixed alcohol. Opening of the alcohol valve is also prevented until the flow of fuel mixture through the carburetor throat becomes sufficient, by the blocking arm 67 controlled by the piston 49. It will be seen that when the butterfly throttle valve is opened sufficiently and the pressure transmitted to cylinder 46 thereby raised high enough (by decreasing the vacuum in that portion of the carburetor throat into which line 47 opens) piston 49 is moved to the right (by spring 54) and the arm 67 thereby moved out of blocking position with respect to the pin 72, thereby freeing arm 70 to turn counter-clockwise to open the alcohol valve to whatever extent such movement is permitted by the member 76. If when the arm 70 is thus freed for opening movement, the engine is sufficiently warm so that the thermostat element 39 exerts a draw upon rod 80, the valve actuating arm 70 is moved thereby to open the alcohol valve, the pin 72 following the arm 67 until arm 70 is blocked by the member 76. Each sufficiently extensive opening of the throttle thus causes opening of the alcohol valve to a pre-determined degree and the injection of a calculated amount of alcohol.

In order to more rapidly diminish the pressure in cylinder 46 upon sudden opening of the butterfly valve, as in severe acceleration, a valve 347 (Fig. 6) for opening the line to the cylinder 46 to the atmosphere whenever the butterfly valve is opened sufficiently is provided, and by thus sharply breaking the vacuum in cylinder permitting the piston 49 to move to the right more rapidly than it otherwise could, thereby more quickly releasing the valve actuating arm 70 to permit quicker injection of the intermixed fuel.

In Fig. 5 I have shown an alternate construction for the mechanism shown in Fig. 2. Instead of the manual control for operating the metering cam 76 as above described, I have here provided an automatic control. Instead of controlling the metering cam from the dash, as in Fig. 2, a thermostat 85 is provided to adjust the metering cam 76 according to the temperature of the motor. To assist the operator in the economical use of anti-knock fluid, a signal light 64a (Fig. 6a) has been provided on the instrument panel. The light is provided to inform the operator when anti-knock fluid is being used, thereby enabling him to economically adjust the use of this fluid and also the length of time that the anti-knock fluid is used. When piston 49 is in the neutral position, as shown in Fig. 2, the light on the dash is lighted because contact point 55 is in contact with contact point 61, thereby closing the circuit and allowing current to pass through lead wire 63 to wire 64 and then to light 64a (Fig. 6a), said light 64a being grounded to complete the circuit. The light on the dash being on, the operator now knows that a mixture of gasoline and anti-knock fluid is being used. To assist the operator in making proper adjustment of the length of time that the anti-knock fluid is in use, I have provided an adjusting lever 59d (Fig. 1), said lever being connected to connecting rod 59a and connecting rod 59a is pivotally mounted on one end of forked rod 58, the forked portion of the rod contacting collar 51, said collar being slidably mounted on boss 52. When the lever 59d is moved downwardly the tension on spring 54 is lessened thereby cutting out the use of the anti-knock fluid and at the same time the circuit through lead wires 63, 64 is broken on account of contact point 55 moving to the left away from contact point 61 and the light on the instrument panel goes out. If it is necessary to increase the length of time that anti-knock fluid is in use the lever 59d should be moved in the opposite direction. This would cause a greater pressure on spring 54 thereby increasing the length of time that the anti-knock fluid is in use. It should be realized that this time element is of a very short duration because the above described apparatus is only in use while the car is being accelerated. The retractile spring 83 is for the purpose of keeping the metering valve 66 in a closed position when lever 42 is in a neutral position, as shown in Fig. 2.

Fig. 6 discloses an alternate means of controlling the valve rod 66. Instead of having two independent means of adjusting the metering valve 101 I here show but one control lever 59a leading to the cowl or dash mechanism shown in Fig. 27. The general operation of this device shown in Fig. 6 is identical with the operation of the device shown in Fig. 2, but in Fig. 6 I show an adjusting cam 76 connected to forked rod 87 by connecting rod 86, and the two are controlled by lever 59a which leads to the dash. The forked rod 87 has the upper portion thereof broached with semi-circular openings to allow for adjustment. If rod 86 is adjusted on forked rod 87 to fit into the upper semi-circular opening you would allow for a richer mixture and if the rod were adjusted to the lower semi-circular opening you would allow for a leaner adjustment because there is less travel of the metering cam when the rod 86 is in the bottom opening and more travel when the rod 86 is in the top opening. The dash control with this construction would require but one lever on the dash instead of two as shown in Fig. 1 for controlling the apparatus. Conduit 47 connects cylinder 46 to the intake manifold 125 entering the same immediately above butterfly valve 102. Interposed between the vacuum cylinder 46 and the butterfly valve 102 is a relief valve and control mechanism. When the butterfly valve 102 is suddenly opened, piston rod 336, which is attached to said butterfly valve, moves to the right causing suction in the rear end of the cylinder 341 and in turn draws relief valve 347 forward causing the opening 349, which is milled out of the stem, to register with opening 355, and atmosphere, thereby allowing said atmosphere to enter and also close off vacuum in conduit 47, causing piston 49 to release to the right allowing valve 66 to open quickly and allow the anti-knock fluid and the common gasoline simultaneously to enter manifold 125 when butterfly valve 102 opens. Without the use of this relief valve there would occur a ping in the combustion chamber, because when opening butterfly valve 102 the suction in chamber 125 above the butterfly valve does not release the vacuum in conduit 47 fast enough to allow piston 49 to release valve 66 and allow anti-knock fluid to enter simultaneously with regular motor fuel. Openings 344, 345 in piston chamber 341 are adjustable with needle valves 344a, 345a for the purpose of controlling the length of time governor release valve 347 will remain in an open position.

In Fig. 7 I have shown a means for metering in the two fuels simultaneously. Valve 101 is so arranged that the fuel is drawn into passages 98, 99. Valve 101, Fig. 8, is so positioned that only ordinary gasoline will flow into the spray nozzle. Fig. 9 illustrates a valve so positioned to allow anti-knock fluid and ordinary gasoline to enter the intake manifold simultaneously through the spray nozzle.

In Fig. 10 is disclosed another form of metering the two fuels into a single spray nozzle. In this form I use a different type of spray nozzle, the valve control being away from the air passage and is built integrally with the carburetor bowl. Normally conduit 116 is open at all times and opening 112 in plunger 107 is aligned with said conduit. As the temperature of the engine increases, rod 80 is actuated by thermostat 39 (Fig. 6) upwardly to pivot rocker arm 118 on pin 120 thus actuating plunger rod 107 in a downward movement and allowing opening 111 to partially align with conduit 115. It can readily be seen that there will be a variation in the alignment made by the constricted portion 111 of the plunger valve 107 depending on the adjustment of cam 76 by operator through rod 78. Through this same action alignment made by opening 112 with conduit 116 is restricted in proportion with the opening made by constricted portion 111 of plunger valve 107. Through the foregoing it will be seen that the amount of anti-knock fluid used in proportion with the ordinary gasoline can be regulated by the driver through the metering action of cam 76. Rod 121 having pin 123 performs the same functions as the arm 70 with pin 72, this having the same vacuum control of valve 107 as previously described in Fig. 6.

Figs. 11, 11a, 12, 13 and 14 illustrate a one unit fuel system wherein the metering mechanism and control system are built integrally with the carburetor. When the engine is cold, needle valve 147 is always in open position, being held upwardly by spring 150. As the engine heats, thermostat 185 expands actuating rod 174 downwardly on pivot 173 which in turn actuates bar 171 on pivot 172 closing valve 147. Rocker link 190 being pivotally connected to rod 174 by pin 193 is pivoted on pin 191 and actuates finger 187 upwardly, said finger being guided by pin 189 in slot 188. Bar 167 is pivoted on pin 169 by spring 163 allowing said bar to lift valve 166 upwardly, said valve being pivoted on bar by pin 168. It will readily be seen that as the thermostat 185 is actuated it lifts finger 187 allowing bar 167 to be pivoted on pin 169 and the valve 166 will be opened. Metering cam 194 is actuated through link 197, and rod 201 by driver, said cam regulating the amount of movement upwards by bar 167 which in turn regulates the valve 166. Obviously the more movement upwards by bar 167 and valve 166 the greater the opening will be for the fluid to flow through as shown in Figs. 15, 16 and 17. Vacuum control operating bar 167 regulates the control of valve 166 and is the same as previously described in Figs. 2 and 6.

If at any time a condition arises where the engine is too cold to operate thermostat 185 and a wide open throttle is used, the pressure responsive valve actuating motor will pivot rocker arm 151 on pin 152 and close valve 147, said rocker arm 151 being positively connected to lug 157 (Fig. 11) by means of a pin 152. The amount of suction created by a wide open throttle is sufficient to draw enough gasoline through inlet conduit 143, Fig. 12, through metering plug 142 and spray nozzle 145. In the ordinary functioning of carburetors now in use, the idling jet coupled with the regular flow of fuel through the venturi, allows a heavy spray of gasoline to go through to the engine, resulting in incomplete combustion and a waste of gasoline. As the throttle is opened and a high vacuum increases the supply of gasoline, the amount of waste is aggravated, all of this being eliminated by the arrangement used by me previously described. The flow of the fuel is as follows: When the engine is cold ordinary gasoline flows through conduit 149 and inlet conduit 143 directly from the bowl into spray nozzle 145 to the venturi. As the engine heats, conduit 149 is closed and ordinary fuel flows at all times through inlet conduits 143 and spray nozzle 145. Simultaneously valve 166 is opened allowing the anti-knock fluid to pass through opening 184 to conduit 146 into venturi shown in Fig. 13, said flow of anti-knock fluid being regulated by the action of the vacuum control. At exceptionally high speeds thermostat 185 is heated to an extreme temperature actuating rod 174 and bar 171 further downwardly to abut bar 171 against push rod 181 opening ball check 178 allowing an increased proportion of anti-knock fluid to flow through conduit 182, 183 and 146 to venturi.

Fig. 18 is an alternate construction of valve 147 (shown in Figs. 11 and 12) in which a vacuum control directly operates ball check valve. When the low vacuum is formed in the riser the piston 204 in cylinder 201 is held in a neutral or downward position by spring 203 forcing ball 211 downwardly through rod 205 and reduced portion 208, thus allowing ordinary fuel to flow through said valve at low vacuum. As the vacuum increases piston 204 operates upwardly allowing ball 211 to seat closing said valve, the ball being actuated by spring 212 thus allowing ordinary fuel to flow through inlet conduit 143 only, thereby reducing the flow of gasoline at high vacuum. This has the same advantage as previously described for reducing fuel supply at high vacuum.

Fig. 19 illustrates a hydraulic operation for control rod 80 supplanting the thermostat 39 shown in Figs. 2, 4 and 6. When the engine is cold piston 219 closes oil inlet 218. As the temperature rises in the oil chamber the thermostat 216 operates plunger valve 219 aligning its reduced portion with oil inlet 218, said oil inlet being directly connected to oil pump thus having a constant pressure on the oil flowing through inlet 218. As the reduced portion of plunger 219 aligns with conduit 218 the oil flows through a conduit 220 into a cylinder 221 forcing piston 222 upwards thus actuating L-shaped lever 224 fulcrumed at 226 actuating the sleeve 45 which is pivotally connected at the lower extremity of L-shaped lever 224 by pin 44

Figs. 20 to 27 illustrate a two fuel control system in which electrical energy supplants vacuum as a medium for operating the foregoing invention. It differentiates in the fact that alcohol is allowed to flow with a certain amount of regular gasoline spasmodically or intermittently. In engines with considerable increase in compression, higher than the special high compression engines made for use with anti-knock fluid used today, alcohol, to be of any value, a mixture of at least 20 to 30% of said fluid and 70 to 80% of ordinary gasoline must be allowed to flow into the cylinders and when such a mixture is used, only a momentary spurt is necessary to relieve the engine of the detonating effect. Instead of allowing a steady flow of the aforesaid mixture which would not add appreciably to the value of the performance of the engine, it is the purpose of this construction to allow only the momentary spurts needed to flow in the cylinders, the operation of which is as follows: As the engine is started and heats up, the thermostat 228 functions and actuates the rod 229 forwardly to actuate contact point 230 to meet contact point 231 thus closing the contact and allowing a steady flow of current to flow through said thermostat. When the throttle control is operated and contact is made with point 286 and plate 289 current can then flow through wire 293 through the thermostat into the governor which is in contact at all times except at exceptionally high speeds, said contact is variable and can be adjusted through the adjusting mechanism on dash which has a rod 254 pivotally connected thereto, said rod being actuated by the movement of adjusting pointer 255. L-shaped lever 256 being pivoted on pin 257 by rod 254 operates the carriage 248 upwardly, said carriage having a contact plate 251 housed into it and said contact plate being constantly in contact with point 295a. As the carriage moves upwardly the period of contact is reduced. Rod 245 having contact point 295a at its outer extremity is pivoted on pin 246 by a governor which slides collar 242 upwardly on shaft 240. As the speed of said shaft increases and weight links 243 are forced outwardly by the centrifugal force, said weight links 243 being pivoted on pin 244. It can readily be seen that contact point 259a describes an arc and as contact plate on carriage is moved upwardly the arc of contact is also shortened thereby the flow of electrical energy is interrupted and ordinary gasoline is used much sooner. While the governor is in contact electrical energy flows through wires 294b to wires 252, 253. Wire 253 leads to solenoid 295b, said solenoid operating a connecting rod 300 having a link 301 pivotally connected thereto, said link operating shaft 66 and valve 101. Wire 252 leads to the dash and is connected to light 296 which operates simultaneously with valve 101 giving the operator a signal when alcohol is used. Plunger 38 (Fig. 21) is of the conventional type and will not be elaborated on.

It will be seen that dash control, shown in Fig. 27, is duplicated, said duplication operating the time when contact is made whether at one-half or three-quarter throttle, and is connected with control rod 290. The operation of contact lever arm 288 (Fig. 25) on throttle lever 284 has been previously described. Referring to Fig. 26, a circuit breaker 294a has been inserted to interrupt the flow of current spasmodically operating valve 101 on shaft 66 reciprocally giving the flow of alcohol an intermittent action.

Figs. 28 to 36 illustrate a method whereby alcohol may be injected into the riser momentarily before the throttle is opened, the purpose of which will be later described. As throttle control lever 36 is actuated, arm 305 floats on shaft 103 operating a rod 307 forcing piston 312 downwardly, said piston forcing gasoline through conduit 320 through ball check valve 321 into conduit 334. Link 323 being solidly connected to shaft 103 is forced downwardly when arm 305 comes in contact with said link opening butterfly valve 102, said link being connected with a dash pot unit by rod 324. It can readily be seen that alcohol is injected to the venturi momentarily before butterfly valve opens thus allowing anti-knock fluid to flow through the riser at the same instant butterfly valve opens. Ordinarily if fluid is injected at the same time butterfly valve opens the fluid must travel from the float chamber through the venturi up to the riser. The time taken by the flow of said gasoline forms a period of hesitancy in which the engine seems to buckle until said charge of gasoline reaches the cylinder. The operation of my invention eliminates this momentary buckling.

Carburetor shown in Fig. 28 is so shaped and arranged as to have the anti-knock fluid bowl forwardly to take advantage of the forward movement of the car allowing the anti-knock fluid to flow more easily and quickly than the ordinary fuel to combustion chamber.

Figs. 30 to 33 illustrate an alternate construction in which the alcohol is taken directly from fuel line utilizing pressure usually found in said fuel lines. When the engine is cold and butterfly valve 381 assumes an upward position shown in Fig. 29 and deflects the exhaust downwardly shown by arrows to a hot spot 383. As hot spot heats up and spiral thermostat 378 begins to expand, butterfly valve 381 closes, this allows the heat of the exhaust to come in contact more quickly with the hot spot. Thermostat 378 being anchored to shaft 379 which operates valve 381, and also control arm 386 being anchored to said shaft 379 by pin 385. Valve stem 382 being pivotally connected to arm 386 by pin 387 is actuated downwardly aligning groove 376 with conduit 334, (Fig. 30). As throttle control rod 36 is actuated suddenly, it forces the disc 363 against disc 364 and spring 366. Piston disc 364 being forced downwardly operating valve stem 365 downwardly aligning groove 370 with conduit 334. Pressure on gas line forces gas through conduit 334 through metering plug 371 into venturi in a fine spray. This spray being under pressure has an action quick enough to perform almost the same operation as carburetor shown in Fig. 28.

Figs. 34 to 36 inclusive show an operation which may be utilized in the electrical system. As throttle control arm 388 is actuated suddenly by rod 390 in a clockwise direction, arm 392 forces against spring 394 which contacts and allows pins 395, 396, to come in contact from then on giving arm 393 a positive action downwardly.

Lever 397 is positively connected to shaft 389, said lever 397 having an arm 401 having a weight 400 attached to its outer extremity, this weight and forward movement of car, tends to keep butterfly valve 399 in a closed position and also holds arm 392 in a fixed position until spring 394 is compressed. While said spring 394 is being compressed, contact is made between contact point 306 and contact plate 405 allowing valve 101 (Fig. 21) to open momentarily before butterfly valve 399 opens. It can be seen that this operation tends to duplicate the same function as in Fig. 28.

The ordinary anti-knock fluid in common use today is of a weak nature, and to be of any benefit, must be used at full strength. In my application I have described a means of using an anti-knock fluid economically, as said fluid is only injected when most needed and from the smallest to the largest quantities are governed by the strength of the anti-knock fluid so as to make it most economical and practical. The adjustments are so sensitive that the changes in the motor temperature and the incoming air in the combustion chamber require different blends of fuel and are economically and scientifically taken care of by said adjustments.

Formerly the carboning of an engine required either an anti-knock fluid to prevent a ping or the removal of the carbon by manual means. When using an anti-knock fluid, a fluid of sufficient strength is required to overcome a ping when the engine is stressed, which is absolutely essential, and yet said stress occures so seldom to make the use of anti-knock fuel too expensive for the ordinary layman. If on the other hand the motorist decides to remove the carbon or have it removed, there is a waste of time, energy and a certain expense objectionable to anyone. Most of the trouble from carbon is removed by the use of my device. Ordinary fuel may be used over the longer period of ordinary driving and when the engine is stressed in picking up or in any other way, the anti-knock fluid injected at that interval has a tendency to soften the carbon which removes any objectionable detonation in the engine. I do not claim that carbon troubles have been entirely eliminated, but it is my contention that said carbon troubles have been greatly reduced and by the use of my device you postpone the eventual removal of carbon by either a special solution poured into the combustion chamber or through manual means, said postponement making the use of an exceptionally high compression engine economical and practical. From the foregoing it can readily be seen that disregarding the quantity of the ordinary fuel used, the blend of the anti-knock fluid with the ordinary fluid can be regulated to overcome any condition of motor or temperature.

I have also disclosed a means to cause the governor vacuum relief valve to open prior to the opening of the butterfly valve in the riser of the carburetor so that anti-knock fluid valve may be opened early enough to allow anti-knock fluid to enter the combustion chamber prior to common gasoline. Also means to provide for a sudden gush of anti-knock fluid to enter the manifold by means of a valve which controls said fluid by pressure caused by the fuel pump and controlled by pressure on the foot throttle connected to the butterfly valve, and means to retard a portion of the suction action on common gasoline when anti-knock fluid is brought into action.

In Fig. 6 springs 82 and 54 are so constructed that when car is operated at 50 to 70 miles per hour, wide open or nearly wide open throttle, piston 49 moves gradually to left, thereby increasing tension on spring 54 and 52 which in turn moves metering valve 66 to a closed position as engine speed increases and vacuum in manifold 125 also increases, thereby gradually decreasing the use of alcohol in proportion to the decrease of the pinging motor.

Operation of the dual fuel system is as follows: When motor is not in operation alcohol valve is held in a closed position by thermostat, engine is started on low grade motor fuel. When temperature of engine has reached a pre-determined point, thermostat moves against spring tension which causes alcohol valve to open whenever it is released by manifold pressure operated thru governor control. The proportioning of the two fuels is accomplished by adjustment from driver's seat by moving hand adjusting lever within his reach. Adjustment is made while motor is operating at wide or nearly wide open throttle when sound from combustion chamber at or slightly before pinging occurs.

Length of time alcohol is used also depends on adjusted setting made by operator after which time pressure in manifold operates valve to open to adjusted position or against adjustment cam. Fuel mixture does not vary when once adjusted during ordinary driving speed.

The pressure breaker valve is adjusted to release sufficient alcohol to a speed of about forty miles per hour which means that alcohol is cut off at about 30 miles per hour there being sufficient alcohol in manifold and combustion chamber to quench the ping up to approximately 40 miles per hour. At higher speed the manifold pressure action is more constant, it however increased with engine speed wide or nearly wide open throttle. When adjustment on cowl is made for higher speed the alcohol discontinues gradually in proportion as pinging disappears and also in advance of pinging.

It must be understood that when car operates in city traffic, manifold pressure is constantly changing, therefore pressure breaker valve is used ahead of governor to control alcohol passage which causes slugs of alcohol to come in contact proportionately with low grade fuel at or before pinging stage to quench pinging, resulting in the use of the least amount of alcohol.

It is possible to eliminate the pinging with pressure breaker valve under almost any driving speed. This is accomplished by stepping down and holding throttle valve open. The pressure breaker valve is adjusted to release sufficient alcohol for a few seconds or up to a speed of about 35 miles per hour when pinging may appear at wide or nearly wide open throttle by releasing foot pressure suddenly and applying it in like manner alcohol action will be repeated in like manner up to car speed of 50 to 60 miles per hour. Above this speed, no further use of alcohol is needed under normal driving conditions with wide or nearly wide open throttle.

It will also be understood that the expression "in response to pressure variation" used in the sub-joined claims, means either variation above atmospheric pressure or minus pressure variation or suction. Or it might be termed minus pressure variation or change in the vacuum conditions as well as plus pressure variations.

It will be understood that the examples shown in the drawings are merely illustrative and that the invention is not limited to the specific constructional details of such example, but that many changes, variations and modifications may be resorted to without departing from the principles of the invention.

I claim:

1. In combination with an internal combustion engine having a fuel feeding system, a fuel inlet and a throttle for controlling the fuel inlet and so the engine, means for supplying a plurality of fuels to the fuel inlet, means including a valve for controlling the flow of one of said fuels independently of another and selectively releasable means limiting opening movement of said valve.

2. In combination with an internal combustion engine having a fuel intake portion, electric means for independently feeding a plurality of fuels to said intake, electric means for controllingly varying the quantity of one fuel fed to said intake relatively to another, including a valve controlling the flow of said controlled fuel, thermostat means for operating said valve at a predetermined temperature and means for closing said valve at exceptionally high speeds.

3. In combination with an internal combustion engine having two fuel feeding means, means for supplying one of said fuels constantly during the operation of said engine, means for causing the other of said fuels to be supplied automatically in advance of pinging conditions, means to cause the supply of said last named fuel to be discontinued automatically.

4. In combination with an internal combustion engine having two fuel feeding means, means for supplying one of said fuels constantly during the operation of said engine, means for causing the other of said fuels to be supplied automatically in advance of pinging conditions, means to cause the supply of said last named fuel to be discontinued automatically prior to the end of pinging conditions.

5. The combination with an internal combustion engine having a throttle controlled fuel inlet and a fuel feeding jet in communication with said inlet, of means for feeding two fuels to said jet including means for insuring a supply of one of said fuels constantly during the operation of said engine and means connected with said throttle for insuring a supply of the other of said fuels at said jet in advance of the opening of said throttle.

6. In combination with an internal combustion engine having a throttle controlled throttle actuating means, a fuel inlet and a jet for delivering fuel to said inlet, two fuel feeding means in communication with said jet, valve means for controlling the supply of said two fuels to said jet, means for connecting said valve means to said throttle actuating means to cause said valve means automatically to insure a supply of one of said fuels constantly but in varying quantities to said jet during the operation of said engine depending upon the engine's operating conditions and to insure a supply of the other of said fuels at said jet in advance of the opening of said throttle when said throttle is quickly actuated towards opened position.

7. In combination with an internal combustion engine having a throttle controlled throttle actuating means, a fuel inlet and a jet for delivering fuel to said inlet, two fuel feeding means in communication with said jet, valve means for controlling the supply of said two fuels to said jet, means for connecting said valve means automatically to insure a supply of one of said fuels constantly but in varying quantities to said jet during the operation of said engine depending upon the engine's operating conditions and to insure a supply of the other of said fuels at said jet in advance of the opening of said throttle when said throttle is quickly actuated towards opened position and electrically operated indicating means responsive to pressure variations in said engine.

8. In combination with an internal combustion engine having two fuel feeding means, means for supplying one of said fuels constantly during the operation of said engine, means for causing the other of said fuels to be supplied automatically in advance of pinging conditions and gradually in proportion as pinging disappears with increase engine speed, with wide or nearly wide open throttle.

9. In combination with a high compression internal combustion engine having two fuel feeding means, one for low gravity and one for high gravity fuels, means for supplying one of said fuels constantly during the operation of said engine, means for causing the other of said fuels to be supplied automatically in advance of pinging conditions, means to cause the supply of said other fuel to be discontinued automatically prior to the end of pinging conditions, means for increasing low gravity fuel at wide or nearly wide open throttle and discontinuing the same when the engine has passed moderate speed.

EDMUND E. HANS.